US012576576B2

(12) United States Patent  
Schultes et al.

(10) Patent No.: US 12,576,576 B2  
(45) Date of Patent: Mar. 17, 2026

(54) APPARATUS AND PROCESS FOR PRODUCING MOULDED, FILLED AND SEALED RECEPTACLE PRODUCTS MADE OF PLASTICS MATERIAL

(71) Applicant: kocher-plastik Maschinenbau GmbH, Sulzbach / Laufen (DE)

(72) Inventors: Michael Schultes, Fichtenau (DE); Michael Sobottka, Welzheim (DE); Achim Rawolle, Aalen (DE)

(73) Assignee: KOCHER-PLASTIK MASCHINENBAU GMBH, Sulzbach/Laufen (DE)

( * ) Notice: Subject to any disclaimer, the term of this patent is extended or adjusted under 35 U.S.C. 154(b) by 0 days.

(21) Appl. No.: 18/569,043

(22) PCT Filed: Jun. 1, 2022

(86) PCT No.: PCT/DE2022/100410  
§ 371 (c)(1),  
(2) Date: Dec. 11, 2023

(87) PCT Pub. No.: WO2022/268253  
PCT Pub. Date: Dec. 29, 2022

(65) Prior Publication Data  
US 2024/0278479 A1      Aug. 22, 2024

(30) Foreign Application Priority Data

Jun. 23, 2021     (DE) ..................... 10 2021 003 226.8

(51) Int. Cl.  
B29C 49/42         (2006.01)  
B29C 48/00         (2019.01)  
(Continued)

(52) U.S. Cl.  
CPC .... B29C 49/42418 (2022.05); B29C 48/0022 (2019.02); B29C 48/10 (2019.02); (Continued)

(58) Field of Classification Search  
CPC ................................................ B29C 49/42418  
See application file for complete search history.

(56) References Cited

U.S. PATENT DOCUMENTS 3,650,678 A * 3/1972 Hansen ................... B65B 55/02  
                                               53/140  
4,166,412 A * 9/1979 Versteege ......... B29C 66/53262  
                                           493/203

(Continued)

FOREIGN PATENT DOCUMENTS

DE      10 2004 004755     5/2005  ............. B65B 55/10  
DE      102016002467 A1   8/2017  ................ A61J 1/05  
(Continued)

OTHER PUBLICATIONS

Search Report for International Application No. PCT/DE2022/100410, 4 pages, Sep. 5, 2022.

*Primary Examiner* — Lucas E. A. Palmer  
(74) *Attorney, Agent, or Firm* — Slayden Grubert Beard PLLC

(57) ABSTRACT

Apparatus for producing molded, filled and sealed receptacle products made of plastics material, comprising—a hose head (32) for dispensing at least one hose extruded using an extrusion means, —a separating means (12) for separating a preform from the hose, —a main mold (24) for accommodating at least one preform in the context of molding thereof, —a transfer means (14) for transferring the preform from the hose head (32) to a filling means (16) for filling via an opening of the preform, and—a supplying means (20) for a sterilizing fluid which allows for flow around at least one filling needle (22) of the filling means (Continued)

(16), characterized in that a further supplying means (30) for sterilizing fluid which at least partially protects at least the opening of the preform in the region below the hose head (32) from contamination is present.

24 Claims, 6 Drawing Sheets

(51) Int. Cl.

| | |
|---|---|
| *B29C 48/10* | (2019.01) |
| *B29C 48/255* | (2019.01) |
| *B29C 48/32* | (2019.01) |
| *B29C 49/04* | (2006.01) |
| *B29C 49/46* | (2006.01) |
| *B29C 49/48* | (2006.01) |
| *B29D 23/00* | (2006.01) |
| *B29L 31/00* | (2006.01) |
| *B65B 55/10* | (2006.01) |

(52) U.S. Cl.
CPC ............ *B29C 48/255* (2019.02); *B29C 48/32* (2019.02); *B29C 49/0412* (2022.05); *B29C 49/42405* (2022.05); *B29C 49/42802* (2022.05); *B29D 23/00* (2013.01); *B65B 55/10* (2013.01); *B29C 2049/4664* (2013.01); *B29C 2049/4887* (2013.01); *B29L 2031/712* (2013.01); *B65B 2210/08* (2013.01)

(56) References Cited

U.S. PATENT DOCUMENTS

| | | | | |
|---|---|---|---|---|
| 4,208,852 | A * | 6/1980 | Pioch .................... | B65B 55/027 |
| | | | | 425/537 |
| 4,510,115 | A * | 4/1985 | Gokcen .................. | B65D 23/00 |
| | | | | 264/525 |
| 4,707,966 | A | 11/1987 | Weiler et al. ................... | 53/410 |
| 4,997,014 | A * | 3/1991 | Weiler .................. | F16K 27/029 |
| | | | | 141/237 |
| 5,759,218 | A * | 6/1998 | Martin ................ | B29C 49/0412 |
| | | | | 53/425 |
| 6,098,676 | A * | 8/2000 | Poynter ................... | B65B 55/02 |
| | | | | 141/93 |
| 6,205,743 | B1 * | 3/2001 | Castellari ................ | B29C 49/04 |
| | | | | 53/53 |
| 6,214,282 | B1 * | 4/2001 | Katou ..................... | B65B 3/022 |
| | | | | 264/525 |
| 8,197,245 | B2 * | 6/2012 | Dordoni .............. | B29C 49/4236 |
| | | | | 425/522 |
| 2004/0065983 | A1 * | 4/2004 | Hansen ................... | B29C 49/04 |
| | | | | 264/525 |
| 2006/0249887 | A1 * | 11/2006 | Maddox ............. | B29C 49/4802 |
| | | | | 425/522 |
| 2008/0041019 | A1 | 2/2008 | Hansen ........................... | 53/452 |
| 2013/0061557 | A1 * | 3/2013 | Kitano .................... | B29C 45/76 |
| | | | | 53/167 |
| 2013/0089642 | A1 * | 4/2013 | Lipson .................. | B33Y 10/00 |
| | | | | 426/115 |
| 2015/0239594 | A1 * | 8/2015 | Batema .................. | B65B 3/022 |
| | | | | 53/426 |
| 2018/0297302 | A1 * | 10/2018 | Groh ................... | B29C 49/0021 |
| 2019/0038508 | A1 | 2/2019 | Spallek et al. | |
| 2019/0375145 | A1 | 12/2019 | Novorolsky et al. | |
| 2022/0041317 | A1 | 2/2022 | Hammer et al. | |
| 2023/0145486 | A1 | 5/2023 | Sauter et al. | |
| 2023/0226743 | A1 * | 7/2023 | Schnell ................ | B29C 48/252 |
| | | | | 264/524 |

FOREIGN PATENT DOCUMENTS

| | | | | |
|---|---|---|---|---|
| DE | 102018007991 | A1 | 4/2020 | ................. A61J 1/06 |
| DE | 102020002007 | A1 | 10/2020 | ........... H01L 21/301 |
| DE | 102020002077 | A1 | 10/2021 | ............ B29C 49/04 |
| JP | H09 99477 | | 4/1997 | ............ B29C 49/42 |
| WO | 2019/236526 | A1 | 12/2019 | ............ B29C 49/02 |

* cited by examiner

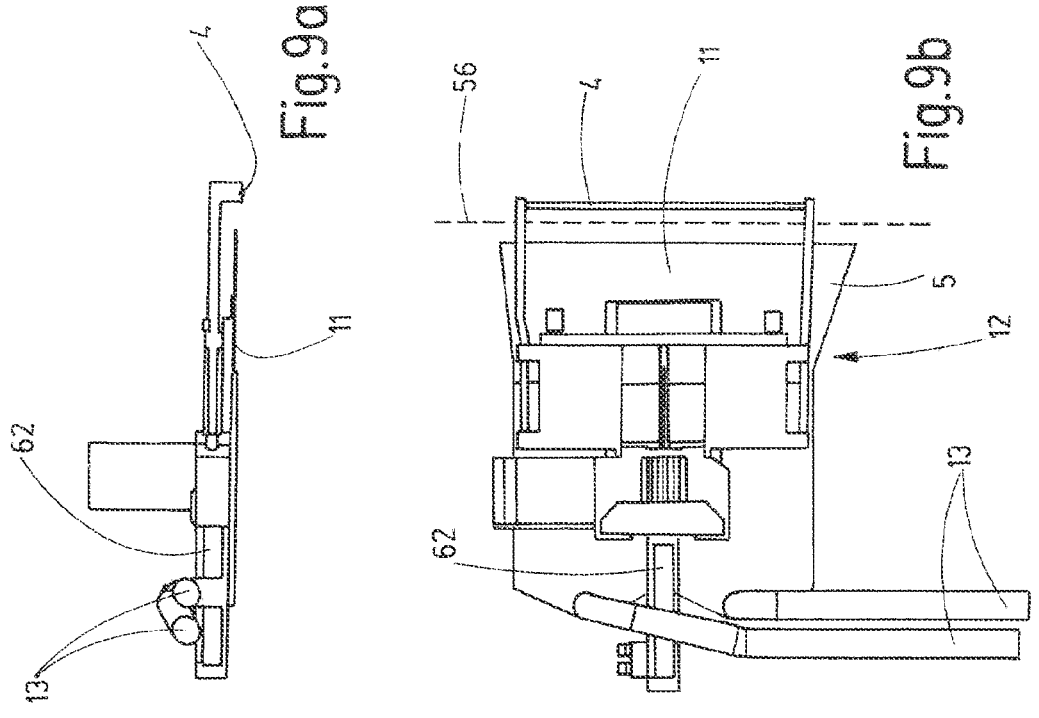
Fig.9a
Fig.9b
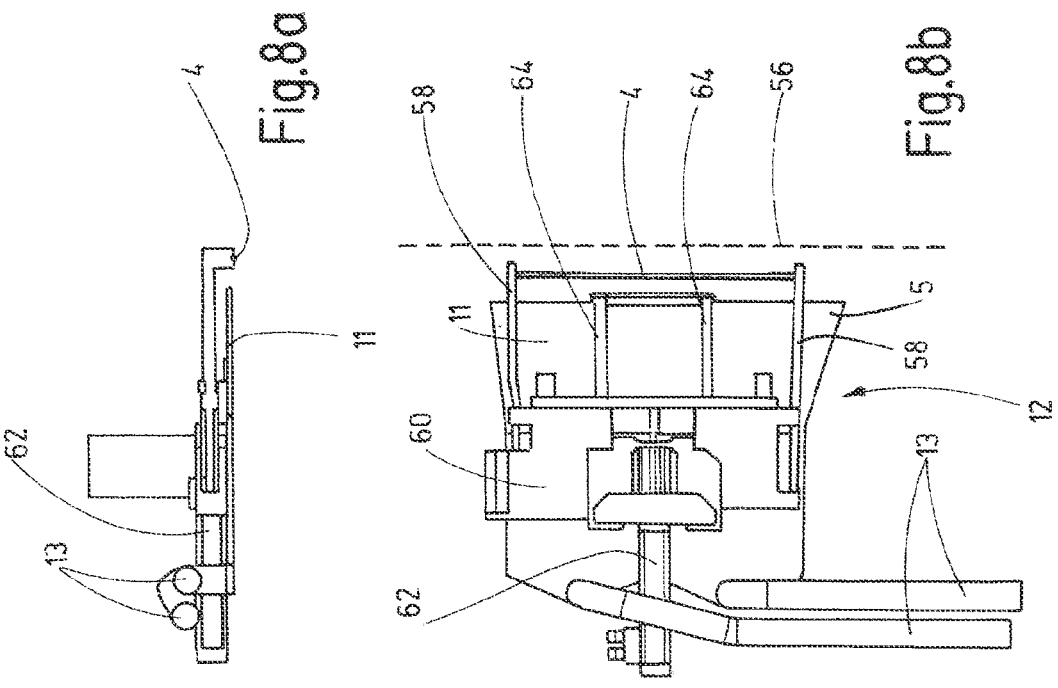
Fig.8a
Fig.8b

APPARATUS AND PROCESS FOR PRODUCING MOULDED, FILLED AND SEALED RECEPTACLE PRODUCTS MADE OF PLASTICS MATERIAL

CROSS-REFERENCE TO RELATED APPLICATIONS

This application claims priority to German Patent Application No. DE 10 2021 003 226.8, filed on Jun. 23, 2021 with the German Patent and Trademark Office. The contents of the aforesaid Patent Application are incorporated herein for all purposes.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The disclosure relates to an apparatus for producing moulded, filled and sealed receptacle products made of plastics material, comprising:

a hose head for dispensing at least one hose extruded using an extrusion means, a separating means for separating a preform from the hose, a main mould for accommodating at least one preform in the context of moulding thereof, a transfer means for transferring the preform from the hose head to a filling means for filling via an opening of the preform, and a supplying means for a sterilising fluid which allows for flow around at least one filling needle of the filling means.

Intermittent Blow-Fill-Seal (BFS) machines for aseptic filling of drugs are installed in rooms classified as cleanroom class C. HEPA-filtered supply air in the room is provided with low turbulence directly via the machine, with the aim of passing clean air vertically through the machine. By constructing intermittent machines with surfaces many arranged horizontally, flow resistances are formed which obstruct the vertical air flow and create turbulence. As a result, the supply air barely penetrates the intermittent machine and is substantially deflected outwards into the surrounding space. By targeted direction of the supply air via baffle plates or the like, it is possible to significantly increase the proportion of supply air that flows through the machine and as such reduce the risk of contamination. However, this is unable to prevent the supply air flowing over various uncontrolled or non-sterile surfaces en route to the critical area. This supply air can therefore not be classified as a class A air supply. A typical example of a corresponding intermittent machine transporting an open preform extruded from a hose head from an extrusion position to a filling position is described in U.S. Pat. No. 4,707,966, for example. In this case, a heat-soft hose is extruded with an extruder, said hose being accommodated in a two-part mould, an open hose portion is cut during this process as a so-called preform and then the open preform is moved to a blowing and/or filling station. In this position, the receptacle is moulded, filled and then sealed at the top by positioning the blowing and/or filling needle.

In any event—as is characteristic of intermittent machines—open receptacle preforms are thus transported between two positions, or, to be more precise, between two regions, the extrusion or hose head region and the moulding/filling region, leading to the risk of particulate and/or microbiological contamination on this transport path.

SUMMARY

A need exists to provide an apparatus that allows, in a simple and cost-effective manner, the open preforms to be protected from particulate, chemical and/or microbiological contamination, also referred to below as contamination for brevity, even during transfer between a hose head region and a moulding/filling region.

The need is addressed by the subject matter of the independent claim(s). Embodiments of the invention are described in the dependent claims, the following description, and the drawings.

BRIEF DESCRIPTION OF THE DRAWINGS

FIGS. 8a, 8b and 9a, 9b show an example separating means in side view and in plan view in four different displacement positions in each case.

DESCRIPTION

Figure 1A:
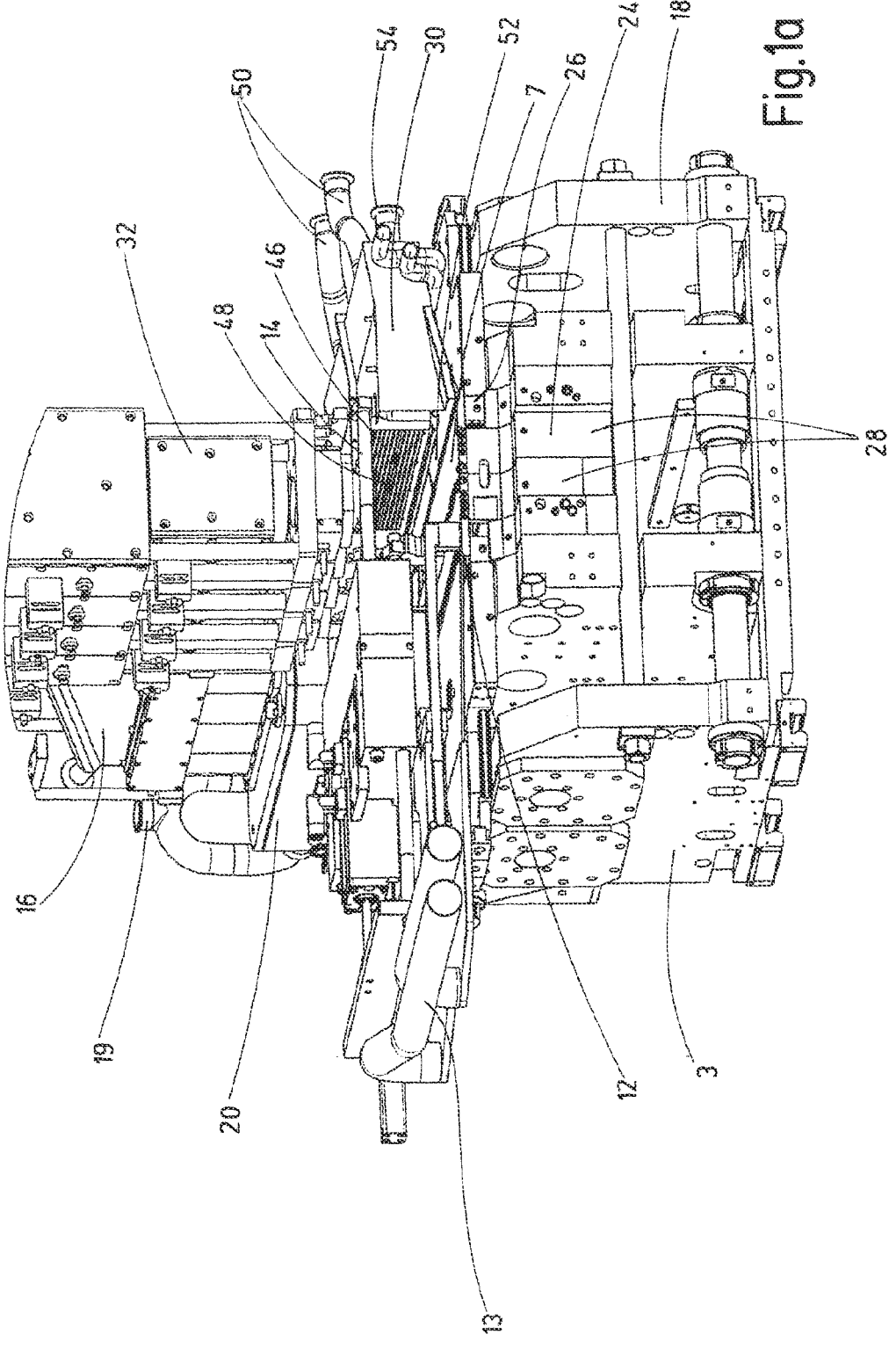
FIGS. 1a and 1b are two perspective side views showing components of the example apparatus.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

By virtue of the fact that a further supplying means is provided for sterilising fluid, which at least partially protects at least the opening of the preform in the region below the hose head at least partially from contamination, the open filling opening of the preform is continuously and in every spatial position protected from particulate, chemical and/or microbiological contamination by means of sterilising fluid even during transport of the preform from the hose head region to the moulding/filling region of the filling means. In particular, during this process, the intention is to achieve a flow towards the open filling opening of the preforms by means of sterilising fluid by a flow, also referred to below as a transverse flow for brevity, which is substantially perpendicular to the movement direction of the preforms and substantially perpendicular to the extrusion direction. In this case, the sterilising fluid for example takes the form of a low-particle sterile gas or gas mixtures such as nitrogen, carbon dioxide, air or similar. Different sterilising fluids may be used within a plant at the same time.

An average expert in this field would regard the apparatus solution according to the teachings herein as surprising given that turbulence and/or induction currents would actually be expected when two gas flows come into contact with each other at an angle, making the required uniform and straightened protective flow 20 impossible. However, the solution according to the teachings herein prevents this particular circumstance happening, as described in greater detail below.

In some embodiments, at least two supplying means are provided for optionally different sterilising fluids, the flow directions of which assume a pre-definable angle, for example 90 degrees, from one another.

Undesirable flow effects are substantially eliminated by virtue of the fact that, in some embodiments, it is provided that the further supplying means for supplying sterilising fluid comprises a dispensing means, which, on the one hand, is a very small distance from the open preforms and, on the other hand, is equipped with a flow straightener to even out the fluid flow. As a result of these apparatuses, the sterilising fluid can also be distributed with low turbulence over the considerable distance between the hose head region and the moulding/filling region perpendicular to the displacement path of the open preforms.

To further improve the flow conditions, in particular to avoid induced currents, it is for example provided that, in addition to the dispensing means, a receiving means is provided which accommodates and discharges at least edge regions of the fluid distributed by the dispensing means. In this manner, a small proportion of the sterilising air flowing in a laminar manner distributed by the flow straightener is sucked up by the accommodating means and stabilises the flow. An aspect of this process is that the dispensing means and the accommodating means are for example in direct spatial proximity to one another. In order to achieve effective contamination protection, working with a supply air flow of 200 to 800 m$^3$/h, for example 400 to 600 m$^3$/h, has been proven in the field, while the discharge gas flow via the accommodating means should make up approximately one twentieth of the supply air flow.

Particular importance is paid to the gas flows at the transition between the two regions that are adjacent to one another, the hose head region and the moulding/filling region. A transverse flow and a vertical flow meet at this transition. To this end, in some embodiments, it is provided that one supplying means for the vertical flow comprises, in addition to movable flow baffle plates, a flow surface for the supply of sterilising fluid with individual flow guide channels which are connected together in a fluid-conveying manner and can be passed through by the individual filling needles while maintaining a pre-definable distance. For example, in this case, it is also provided that, in order to connect the flow guide channels to one another in a fluid-conveying manner, a central channel engages through the flow surface, said central channel having an extension of the cross-sectional area at least at one end. In this manner, irrespective of the respective filling needle position, spatially stable flow conditions can be achieved, particularly also at the transition between the hose head region and the adjacent moulding/filling region and contamination of the inside of the receptacle can safely be avoided.

In some embodiments, it is provided that a further third supplying and/or discharge means for a fluid is provided in the hose head region along the separation zone of the separating means, also referred to below as a cutter for brevity, said third supplying and/or discharge means guaranteeing a low-contamination environment in the separation zone during the process to separate the preform from the extrusion hose. Separation is usually performed by a kind of cutter, which may for example be heated as it is designed as a hot cutter, or, optionally, is able to cut in a vibrating manner if it is designed as a vibrating cutter, and contactless separation by means of laser radiation by a laser cutter is also possible. The formation of particles, gases, vapours or smoke cannot be entirely ruled out in any of these separation processes. In order to also rule out an associated potential contamination of the preform or receptacle, it has proved to be beneficial to discharge this contamination by a direct cutter extraction from the separation zone of the hose head region. In a particularly beneficial manner, this does not take place in the manner described in the prior art (US 2019/0375145 A1) in a vertical direction upwards by means of an annular nozzle, but rather substantially perpendicular to the discharge of the extrusion hoses through a corresponding slotted nozzle. In this process, the flow direction in the slotted nozzle beneficially corresponds to the flow direction of the transverse flow supply air with the result that some of the transverse flow supply air can thus also be discharged through the slotted nozzle of the cutter extraction system. In order to minimise turbulence and similar undesirable flow effects, according to the teachings herein it has proved to be especially effective to position the slotted nozzle at a constant distance from the respective cutter, i.e., to respectively operate or move said nozzle in a synchronised manner together with the cutter. Alternatively, it is also possible, similar to the case of the further supplying means, to provide an independent supplying or discharge means for a sterilising fluid or ambient air which can also be discharged from the region of the separation zone at the same time.

In some embodiments, it is provided that a further fourth supplying means is provided for an optional different sterilising fluid, which acts on the hose extruded from the hose head of the extrusion means as a support fluid in the extrusion direction. In this manner, even when the extruded hose leaves the hose head, this not only produces a dispensing path in a straight line but also guarantees the contamination-free environment in the hose head region at the same time.

In a process for producing a moulded, filled and sealed receptacle product, in particular using an apparatus as described above, at least the following beneficial production steps are provided:

Applying a sterilising fluid to the opening of a preform while said preform is at least partially and temporarily in the region beneath the hose head, Applying a sterilising fluid to the opening of a preform while said preform is at least partially and temporarily in the region of the filling means and Controlling the sterilising fluid flows in such a way that these run transversely to one another.

'Transverse path' in the sense of the process means that the sterilising fluid flows are for example perpendicular to one another; however, it should also cover supply directions running obliquely, for example in a pre-definable enclosed angular region of 60 degrees up to the specified 90 degrees. The apparatus and process solution according to the teachings herein ensures that the preforms, which are open at the top, are continuously, and particularly also when moving from the hose head region to the moulding/filling region, extensively protected in the respective regions from particulate, chemical and/or microbiological contamination, both the apparatus and the process being able to be implemented in the context of standard intermittent machines in a simple and cost-effective manner.

The apparatus and the associated process are explained below in further detail using the apparatus according to FIGS. 1 to 9, shown in outline and not to scale. Specific references to components, process steps, and other elements are not intended to be limiting. Further, it is understood that like parts bear the same or similar reference numerals when referring to alternate FIGS.

Figure 1B:
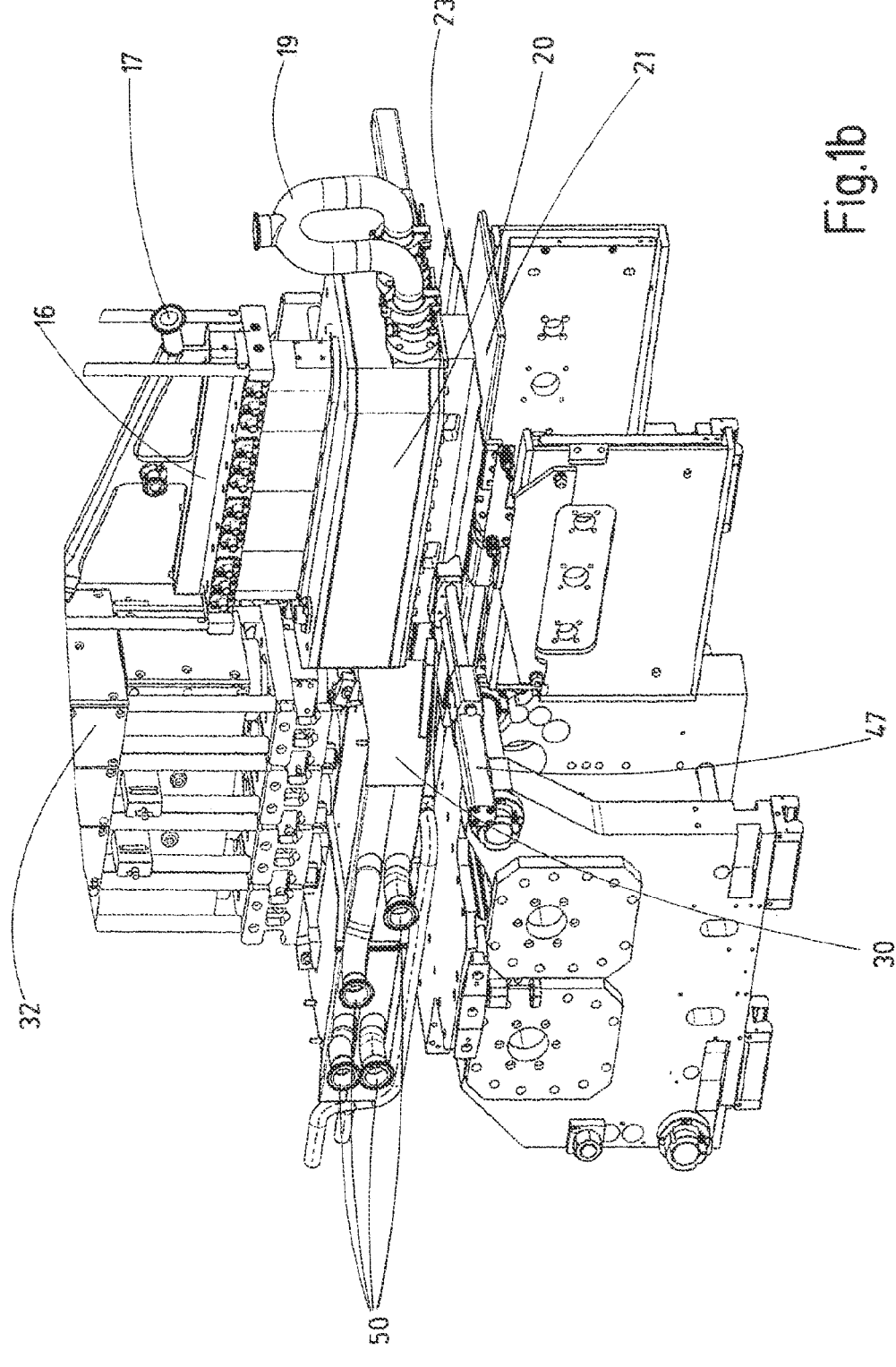

FIGS. 1a and 1b show the key components of an apparatus for producing moulded, filled and sealed receptacle products made of plastics material. Thus, the apparatus comprises a hose head 32 as part of an extrusion means, which is not shown in greater detail, for extruding at least one hose from a deformable plastics material, a plurality of such hoses for example emerging next to one another from the hose head 32 at the same time. Furthermore, a movable separating apparatus (also referred to as a cutter below for brevity) 12 is provided for separating a preform from the respectively assignable extruded hose. In addition to a first supplying means 20 at the location of a filling means 16, the apparatus also comprises, on the hose head region, to protect the preforms from possible contamination, a further supplying means 30 for a sterilising fluid to flow towards the preforms, particularly from the opening thereof, the associated flow pattern also being referred to below as a transverse flow for brevity.

In the customary manner, a transfer means in the form of a hose grab 14 is used to transfer the open preforms into an open mould 24 of a moulding means 18. Furthermore, associated holding jaws 7 are provided on the surface of the upper side of the moulding means 18. The mould 24 may in this case be located either beneath the hose head 32 or, in another embodiment (DE 10 2020 002 007), it may already be in the moulding/filling region. Only the first case is described below, but the same procedure can be followed accordingly for the second case.

Figure 2:
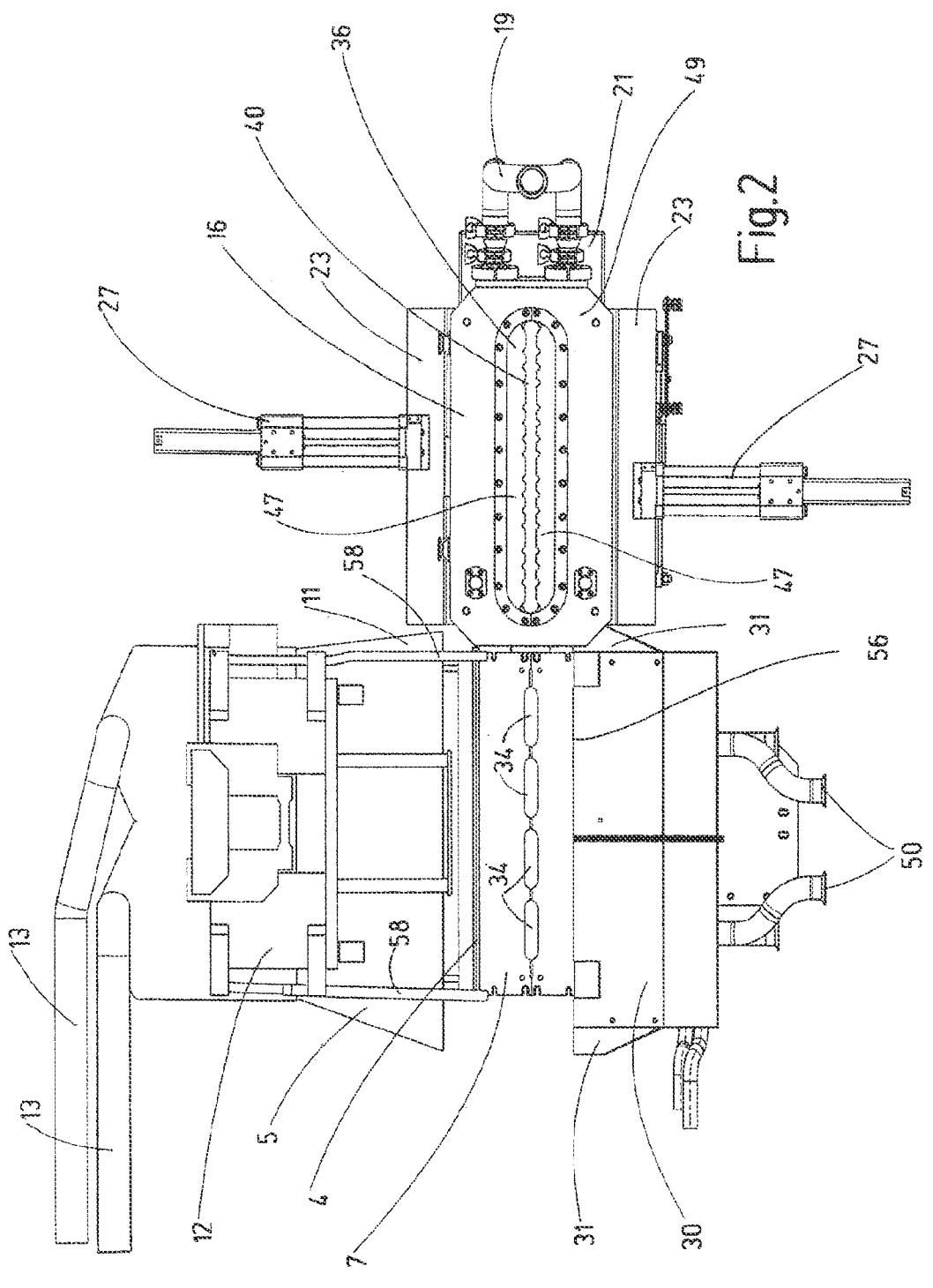
FIG. 2 is a plan view of exposed components of the apparatus according to FIG. 1.

In the customary manner for a receptacle moulding operation from the respective preform, the moulding means 18, as part of a closing unit 3, comprises a main mould 24 and a top mould 26. The respective mould 24, 26 consists of individual mould halves 28, which can be moved away from one another from the closed position in FIG. 1 for an accommodating operation for the preform. The main mould 24 and the top mould 26 can be controlled separately from one another with their respective mould halves 28. If, when the main mould 24 is opened, the preform is in the proposed position by means of the grab 14, the main mould 24 closes when the top mould 26 is opened and moves in a linear manner from the region beneath the hose head 32 into the adjacent moulding/filling region beneath a filling unit 16 and the filling unit 16 is loaded with filling material in the customary manner via a filling material supply 17 (FIG. 2). Here, the blowing and/or filling needle 22 (FIG. 6) of the filling means 16 is positioned on the opening of the preform and moulding takes place by blowing and/or vacuum moulding, followed by filling via the filling opening thereof and sealing the top side by closing the top mould 26.

Subsequently, both moulds 24, 26 are then opened again for removal of the finished receptacle product, the sealed receptacles are discharged and the moulds 24, 26 are again moved back into the hose head region so that a new production operation can take place. The corresponding production process is the conventional procedure for (blow) moulding, filling and sealing of a receptacle product, which is why this is not described in greater detail at this juncture.

The supplying means 30, which extends substantially over the entire axial opening length of the moulding means 18, i.e., along the entire hose head region, and is directly adjacent to the moulding/filling region, thus allows the opening of the preforms to be protected seamlessly and continuously from contamination. Beneficially, the distance between the dispensing means of the supplying means 30 to the opening plane of the moulding means 18 is less than 40 cm, for example less than 25 cm, or less than 20 cm.

While, when viewed in the direction shown on FIG. 1, a sterilising fluid can flow out vertically from top to bottom (vertical flow) via the first supplying means 20 with supply port 19 in the moulding/filling region and be passed through the movable flow baffle plates 21, 23, the flow direction for the sterilising fluid in the further supplying means 30 with the further flow baffle plates 31 (FIG. 2) is, however, directed horizontally (transverse flow), such that the two flow directions of both supplying means 20, 30 for the sterilising fluid assume a pre-definable angle of 90 degrees to one another. The two angled baffle plates 23 can be displaced via motion units 27, which makes it easier to clean and/or sterilise the moulding/filling region. The baffle plate 21 can be moved according to the transfer motion of the preforms (details are not shown).

Using the solution according to the teachings herein, supplying means 20, 30 are implemented which allow very good results with avoiding contamination, particularly in the region of the filling opening of a receptacle product. Depending on the installation conditions on an apparatus according to the teachings herein, however, the corresponding flow angle can be varied, particularly greater than or less than 90 degrees.

As shown by FIG. 2 in particular, the extrusion means comprises a hose head 32, which allows four hoses to be produced in four separate hose positions 34. Separation of the preforms from the hose is achieved via the movable cutter 4 of a separating means 12; in this process, any contaminants that may potentially arise can be discharged via a cutter extraction system 5, which is also movable, and via the ports 13. A sterilising fluid is output via the further supplying means 30 perpendicular to the discharge direction of the hoses. The four preforms are received in the mould at the positions 34 and moved from the hose head region into the moulding/filling region of the filling unit 16 in the main mould 24. In this region, originating from the supplying means 20 and also guided through the baffle plates 21, 23, a predominantly vertical flow is provided to protect the filling needles 22 (FIG. 6) and the filling opening of the preforms.

Figures 3, 4, 5:
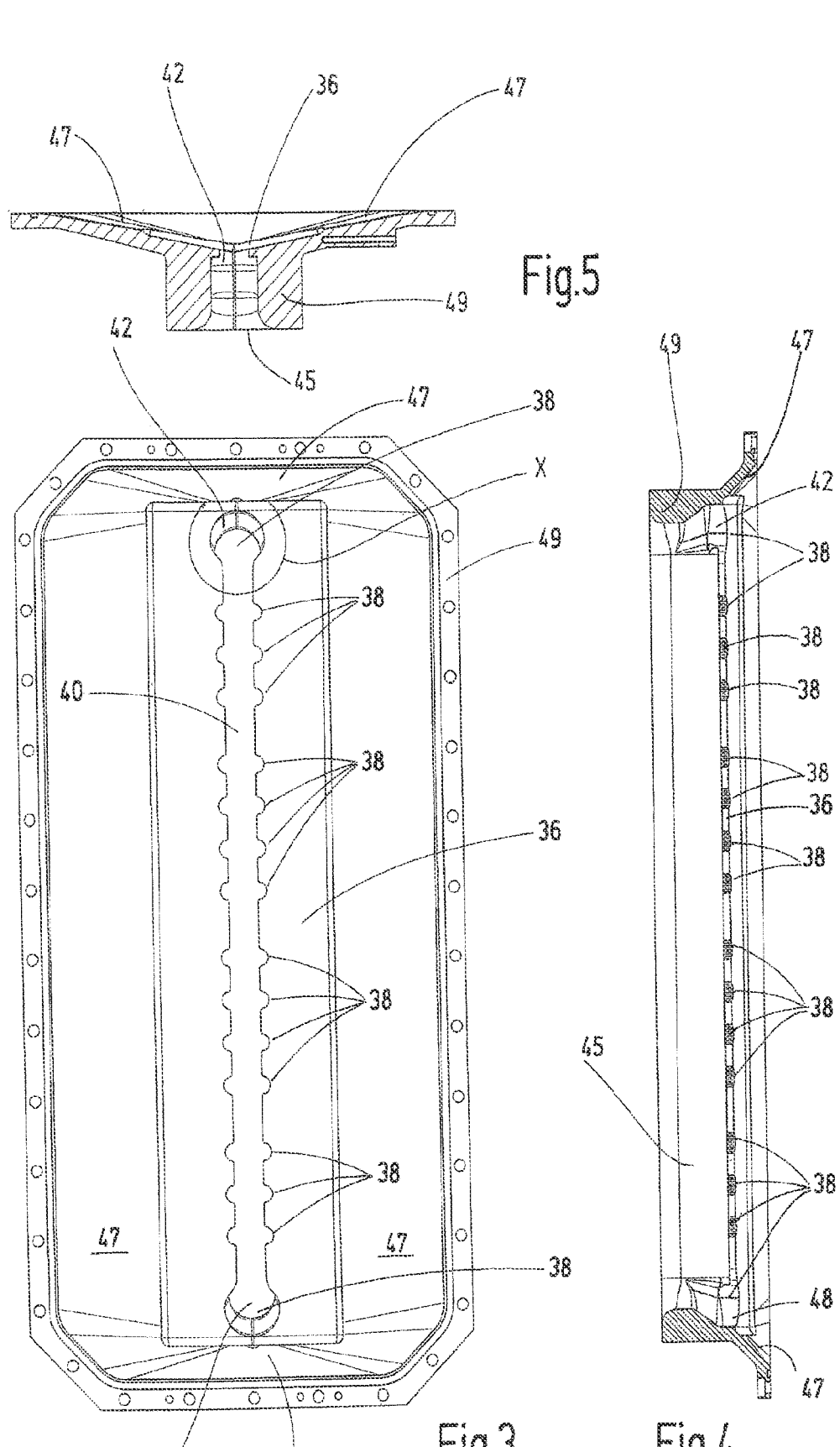
FIGS. 3, 4 and 5 are different views of an example flow guide apparatus in the context of sterile filling of receptacle products.
Figure 7:
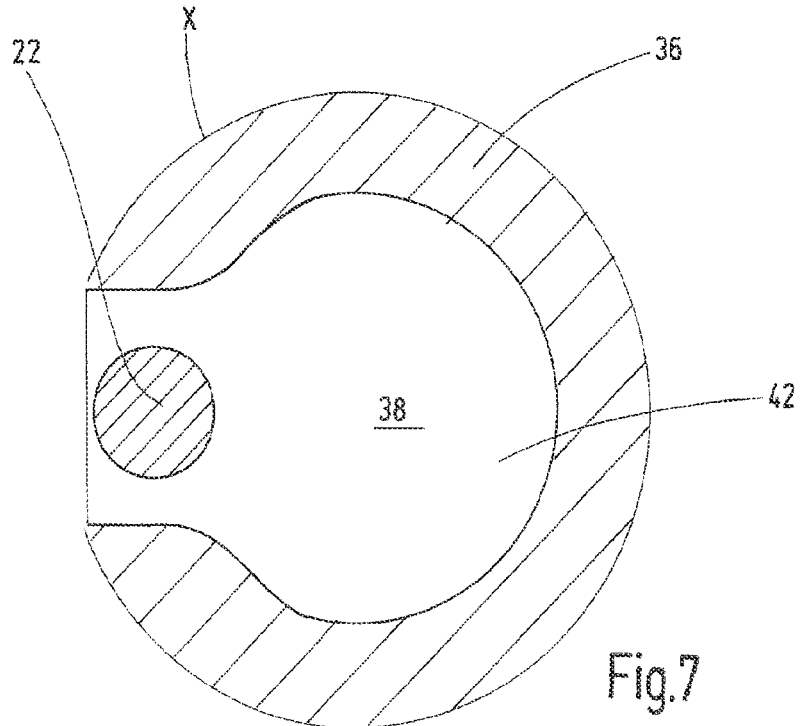
FIG. 7 shows a partial section marked with an X in a circle in FIG. 3 with an example filling needle engaging in the flow guide channel.

In FIG. 3, the flow surface 36 of the first supplying means 20 with the predominantly vertical flow direction described above is shown in more detail. The flow surface 36 has individual flow guide channels 38, which are connected to a central slot passage as a central channel 40, the end of which is in each case connected to a flow channel 38 with a cross-section with a wider diameter as an extension 42. Otherwise, the flow guide channels 38, as shown in particular in FIG. 3, are formed by semicircular cross-sectional areas, which engage through the flow surface 36 in a media-conveying manner and in each case transition into the adjacent flat wall portions of the flow surface 36. Each flow guide channel 38 is assigned to a filling needle 22 and, apart from the two end flow guide channels 38 in the form of the extension 42, the filling needles 22 engage centrally, observing a pre-definable distance, through the central channel 40 in a central position with respect to the semicircular adjacent channel portions of the flow guide channels 38. The aforementioned central channel 40 therefore in this respect creates the fluid-conveying connection of the flow guide channel 38 for the sterilising fluid and thus forms a slot passage which engages through the flow surface 36 which is otherwise closed. As can best be seen on FIGS. 3 and 7, the central channel 40, as already disclosed, comprises an extension 42 to the free cross-sectional area at its respective opposite end, wherein the filling needle 22 arranged in the outermost position in each case, as shown in FIG. 7, does not engage through the corresponding extension 42 but is connected at the edge to said extension in the direction of the adjacent flow guide channels 38. In this respect, however, the groups of four filling needles 22 have the same distance from one another; the distances between the filling needles 22 in a group of four are also identical.

Figure 6:
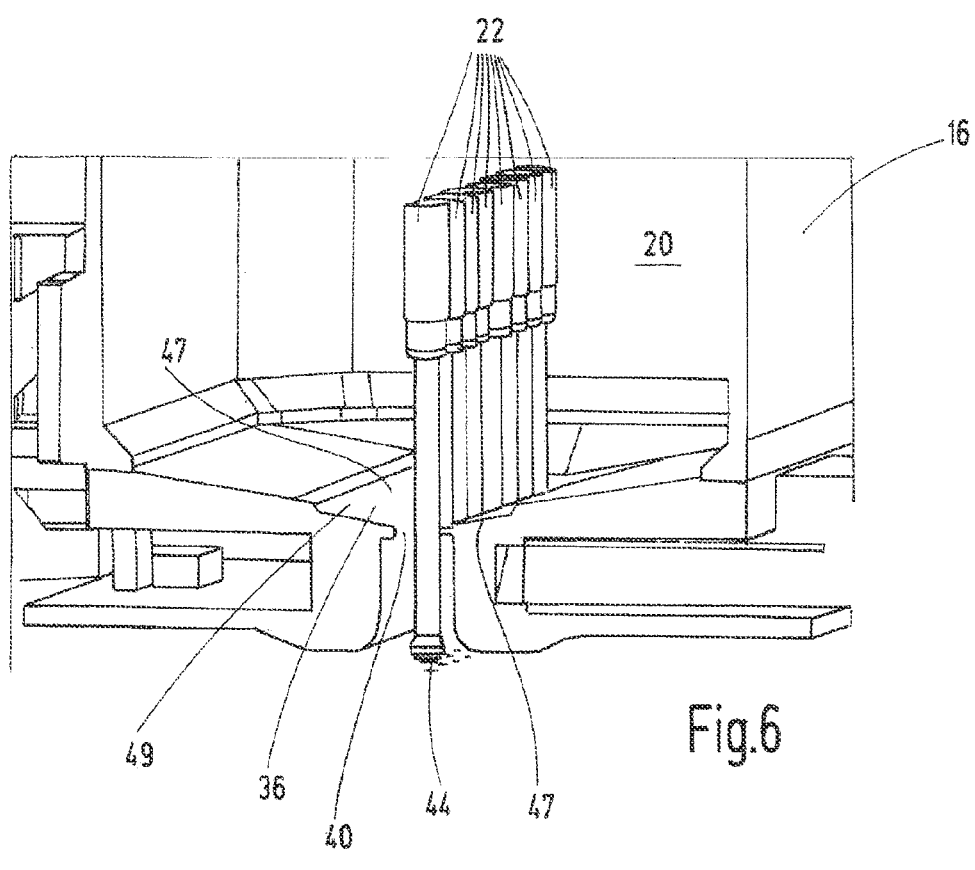
FIG. 6 shows individual example filling needles of a filling means which engage through the flow guide channels illustrated in FIGS. 3 to 5.

As shown in FIG. 6, four filling needles 22 can be used to fill the receptacle moulded in the main mould 24 for each extruded hose.

It has been shown to be particularly beneficial if the cross-sectional area of at least one end extension 42 is selected such that it is approximately between 8 to 12 times the cross-sectional area of one of the filling needles 22. In the filling system of the filling means 16 disclosed here, four groups, each with four filling needles 22, i.e., a total of sixteen tube-like filling needles 22, are therefore used, each having a diameter of approximately 10 mm and a cone 44 (see FIG. 6) with a diameter of approximately 15 mm. In this case, the total cross-sectional area of the central channel 40, designed in the form of a slotted nozzle, was selected to be approx. 86 cm² for a cross-sectional area of a filling needle 22, at a distance thereto, of 0.8 cm².

In this case, stable flow conditions beneficially arise, irrespective of the filling needle position and even at the transition between the hose head region and moulding/filling region, if, in this respect, the partially semicircular surfaces FA of each flow guide channel 38 located between the two extensions 42 corresponds to approximately 40 to 80% of the cross-sectional area FD of a typically cylindrical filling needle 22; i.e., FA=0.4×FD to FA=0.8×FD, also FA=0.5× FD. According to the drawing in FIG. 6, the sterilising air is therefore passed via the supplying means 20 on the outer circumference along the filling needles 22 from top to bottom in the form of a closed curtain, and the sterilising air leaves the central channel 40 with its individual flow guide channels 38 on the underside 45 (FIG. 5) of the flow surface 36 thus formed as part of the supplying means 20. The implementation described here is only given by way of example; thus, the selected number of extruded hoses, filling needles 22 and the number of individual moulds of the moulding means 18 may also be different.

As is also shown in FIG. 5, the surface portions 47 of the flow surface 36 are designed to be inclined towards the middle central channel 40, for example arranged along a slope of 15 to 30 degrees, or may be approximately 20 degrees, such that the central channel 40 with its extensions 38 thus forms the lowest point within the flow surface 36. As FIG. 4 shows in particular, the flow surface 36 is part of a flow conduit 49 with a modular design, which can be produced in different sizes, adapted for a wide variety of machine types for the apparatus according to the teachings herein.

As is also shown in FIG. 1, the further supplying means 30 to supply a sterilising fluid comprises a rectangular dispensing means 46, which is provided to even out the fluid or flow guidance with a flow straightener 48, in the form of individual baffle plates extending parallel to one another, which thus support the formation of a laminar, non-turbulent flow of sterilising air. Thus, the further supplying means 30 forms a kind of supply air conduit, which can also be subdivided into individual chambers for improved flow guidance and comprises fluid ports in the rear region 50 for supplying the sterilising air. Further baffle plates 31 (FIG. 2) guide the flow of sterilising fluid in the edge regions, particularly to the adjacent moulding/filling region.

In addition to the dispensing means 46, an accommodating means 52 is provided, which accommodates ambient air and, partially, the sterilising fluid flowing out of the dispensing means 46 and discharges it in a media-conveying manner from the apparatus from a dispensing zone in the region of the transition via at least one connecting line 54. Surprisingly, induction currents were able to be suppressed by means of this partial flow overlapping and it was possible to achieve an overall outcome of a laminar transverse flow with low turbulence. For example, the accommodating means 52 is furnished with a slot-shaped opening, the free cross-section of which is smaller than the rectangular dispensing area of the dispensing means 46. Furthermore, the slotted opening extends substantially over the entire length of the supply 30 parallel to the opening plane of the mould halves 26 of the moulding means 18.

In any event, the transverse flow using the dispensing means 46 is selected such that the openings of the preforms, particularly the openings released by the top mould halves 26, are coated laterally inside by the sterilising air, even while the preforms are moving towards the filling means 16.

In the apparatus according to the teachings herein, it is for example also provided that the further discharge means 5 with ports 13 for contaminants such as particles, gases, vapours, smoke, for example, is provided along the movable cutter 4 (FIG. 2) of the separating means 12, said discharge means being able to be formed such that it ends in a slot-shaped nozzle 11, which extends substantially perpendicular to the extrusion direction and parallel to the cutter 4. In this process, the flow direction in the slotted nozzle 11 may beneficially correspond to the flow direction of the transverse flow supply air originating from the dispensing means 46. Thus, some of the transverse flow supply air can be discharged via the dispensing means 46 through the slotted nozzle 11 of the cutter extraction system 5 through the ports 13 thereof. In order to minimise unnecessary turbulence and similar undesirable flow effects, it has proved to be beneficial to position the slotted nozzle at a constant distance from the cutter 4 and to for example respectively operate or move said nozzle in a synchronised manner together with the cutter 4. Alternatively or in addition, it is also possible to provide a completely independent supplying and discharge means (not shown) for sterilising fluid in the region of the separating means 12, which operates independently from the supplying means 20, 30.

In some embodiments of the apparatus according to the teachings herein, a further fourth supplying means (not shown) may be provided for sterilising fluid in the hose head 32, said supplying means acting as a support fluid inside the extruded hose. With the aforementioned measures for guidance of the flows, based on support fluid, cutter extraction 5, supply 30, receipt 52 in the hose head region and supply 20 in the moulding/filling region in addition to baffle plates 21, 23, it is thus possible to achieve reliable low-contamination receptacle production at all production positions. This therefore has no parallel in the prior art.

The separating means according to the teachings herein is again explained in further detail below with the aid of FIGS. 8a, 8b, 9a and 9b, said separating means being used to move the slotted nozzle 11 along with the cutter 4 of the separating means 12. The blade-like cutter 4 designed in the form of a cutting wire or a steel blade is received between two clamps 58 which serve to guide the cutter at one end and, at the other end, are connected to a slider 60, which can be displaced forwards and backwards together with the slotted nozzle 11 by means of a linear cylinder 62 that can be driven by electrical means, wherein, in the back position according to FIGS. 8a and 8b, the separation zone 56 is released and, in the drawing shown in FIGS. 9a and 9b, the corresponding separation zone 56 is driven over by parts of the separating means 12 for an operation to separate the preforms. To support the displacement movement, two guide shafts 64 are provided, which are arranged in a stationary manner forming a guide for the longitudinal movement of the slider 60, on which the slotted nozzle 11 is arranged along with the linear cutter 4.

A process for producing a moulded, filled and sealed receptacle product can be carried out using the aforementioned apparatus, having the following characteristic production steps:

Applying a sterilising fluid to the opening of a preform while said preform is separated from the hose, while the preform is located beneath a hose head 32 in the hose head region, and while the preforms are moving towards the moulding/filling region of a filling means 16, Applying a sterilising fluid while the open preform is in the moulding/filling region of the filling means 16 and Controlling the sterilising fluid flows in such a way that these run transversely with respect to one another.

By means of the corresponding process using the apparatus, receptacle products can be obtained as disclosed by way of example in DE 10 2018 007 991 A1, DE 10 2016 002 467 A1, etc. and which, in particular, are used for sterile storage of pharmaceutical products.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. An apparatus for producing moulded, filled and sealed receptacle products made of plastics material, comprising:

a hose head for dispensing at least one hose extruded using an extruder;

a cutter for separating a preform from the hose;

a main mould for accommodating at least one preform in the context of moulding thereof;

a drive for transferring the preform from the hose head to a filling system for filling via an opening of the preform; and a supply for a sterilising fluid which allows for flow around at least one filling needle of the filling system at least during the filling;

wherein a further supply for sterilising fluid is present, which further supply at least partially protects at least the opening of the preform in the region below the hose head and during transport of the preform from a region of the hose head to the filling system from contamination.

2. The apparatus of claim 1, wherein at least partially, during transfer of the preform from the hose head to the filling system using the drive, at least the opening of the preform is protected from contamination by a sterilising fluid.

3. The apparatus of claim 2, wherein the flow direction of the respective sterilising fluid, originating from one supply, assumes a pre-definable angle of 65 degrees to 115 degrees, or 90 degrees, to the flow direction of the respective sterilising fluid of the further supply.

4. The apparatus of claim 2, wherein at least one flow baffle plate is attached in the region of the filling system.

5. The apparatus of claim 2, wherein one supply comprises a flow surface for the supply of sterilising fluid with individual flow guide channels, which are connected together in a fluid-conveying manner and can be passed through by the individual filling needles.

6. The apparatus of claim 1, wherein the flow direction of the respective sterilising fluid, originating from one supply, assumes a pre-definable angle of 65 degrees to 115 degrees, or 90 degrees, to the flow direction of the respective sterilising fluid of the further supply.

7. The apparatus of claim 6, wherein at least one flow baffle plate is attached in the region of the filling system.

8. The apparatus of claim 1, wherein at least one flow baffle plate is attached in the region of the filling system.

9. The apparatus of claim 8, wherein the at least one flow baffle plate is movable.

10. The apparatus of claim 1, wherein one supply comprises a flow surface for the supply of sterilising fluid with individual flow guide channels, which are connected together in a fluid-conveying manner and can be passed through by the individual filling needles.

11. The apparatus of claim 10, wherein, in order to connect the flow guide channels to one another in a fluid-conveying manner, a central channel engages through the flow surface, said central channel having an extension of the cross-sectional area at least at one end.

12. The apparatus of claim 1, wherein the further supply for supplying sterilising fluid comprises a dispenser, which is furnished with a flow straightener to even out the fluid flow.

13. The apparatus of claim 12, wherein, in addition to the dispenser, a receiver is provided, which accommodates, at least partially, the sterilising fluid flowing out of the dispenser and discharges it from a dispensing zone in the region of the transition.

14. The apparatus of claim 13, wherein the receiver is arranged such that it is spatially adjacent to the dispenser.

15. The apparatus of claim 12, wherein the dispenser is a distance of less than 40 cm from the longitudinal axis of the preform which passes through the opening thereof.

16. The apparatus of claim 1, wherein a further third supply and/or discharge for sterilising fluid and/or ambient air is provided along a separation zone of the cutter, said third supply and/or discharge providing a low-contamination environment in the separation zone during the process to separate the preform from the extrusion hose.

17. The apparatus of claim 16, wherein the discharge is movable, for example adjustable to the motion of the cutter.

18. The apparatus of claim 1, wherein a further fourth supply for sterilising fluid, which flows into the inside of the extruded hose and acts on said hose as a support fluid, is provided on the hose head.

19. The apparatus of claim 1, wherein the receptacle products are receptacles for medical purposes.

20. A process for producing a moulded, filled and sealed receptacle product, comprising:

applying a first sterilising fluid to the opening of a preform while said preform is at least partially and temporarily in a region beneath a hose head;

applying a second sterilising fluid to the opening of the preform while said preform is at least partially and temporarily in the region of a filler; and controlling the first and second sterilising fluid flows in such a way that these run transversely to one another.

21. An apparatus for producing moulded, filled and sealed receptacle products made of plastics material, comprising:

a hose head for dispensing at least one hose extruded using an extruder;

a cutter for separating a preform from the hose;

a main mould for accommodating at least one preform in the context of moulding thereof;

a drive for transferring the preform from the hose head to a filling system for filling via an opening of the preform; and a supply for a sterilising fluid which allows for flow around at least one filling needle of the filling system;

wherein a further supply for sterilising fluid is present, which further supply at least partially protects at least the opening of the preform in the region below the hose head from contamination; and wherein one supply comprises a flow surface for the supply of sterilizing fluid with individual flow guide channels, which are connected together in a fluid-conveying manner and can be passed through by the individual filling needles.

22. An apparatus for producing moulded, filled and sealed receptacle products made of plastics material, comprising:

a hose head for dispensing at least one hose extruded using an extruder;

a cutter for separating a preform from the hose;

a main mould for accommodating at least one preform in the context of moulding thereof;

a drive for transferring the preform from the hose head to a filling system for filling via an opening of the preform; and a supply for a sterilising fluid which allows for flow around at least one filling needle of the filling system;

wherein a further supply for sterilising fluid is present, which further supply at least partially protects at least the opening of the preform in the region below the hose head from contamination; and wherein a further third supply and/or discharge for sterilising fluid and/or ambient air is provided along a separation zone of the cutter, said third supply and/or discharge providing a low-contamination environment in the separation zone during the process to separate the preform from the extrusion hose.

23. An apparatus for producing moulded, filled and sealed receptacle products made of plastics material, comprising:

a hose head for dispensing at least one hose extruded using an extruder;

a cutter for separating a preform from the hose;

a main mould for accommodating at least one preform in the context of moulding thereof;

a drive for transferring the preform from the hose head to a filling system for filling via an opening of the preform; and a supply for a sterilising fluid which allows for flow around at least one filling needle of the filling system;

wherein a further supply for sterilising fluid is present, which further supply at least partially protects at least the opening of the preform in the region below the hose head from contamination; wherein at least one flow baffle plate is attached in the region of the filling system; and wherein the at least one flow baffle plate is movable.

24. An apparatus for producing moulded, filled and sealed receptacle products made of plastics material, comprising:

a hose head for dispensing at least one hose extruded using an extruder;

a cutter for separating a preform from the hose;

a main mould for accommodating at least one preform in the context of moulding thereof;

a drive for transferring the preform from the hose head to a filling system for filling via an opening of the preform; and a supply for a sterilising fluid which allows for flow around at least one filling needle of the filling system;

wherein a further supply for sterilising fluid is present, which further supply at least partially protects at least the opening of the preform in the region below the hose head from contamination; wherein at least partially, during transfer of the preform from the hose head to the filling system using the drive, at least the opening of the preform is protected from contamination by a sterilising fluid; and wherein one supply comprises a flow surface for the supply of sterilising fluid with individual flow guide channels, which are connected together in a fluid-conveying manner and can be passed through by the individual filling needles.

* * * * *